(12) United States Patent
Deng et al.

(10) Patent No.: US 11,858,034 B2
(45) Date of Patent: Jan. 2, 2024

(54) CASTING AND OUTPUTTING SYSTEM

(71) Applicant: JIANGXI NERIN EQUIPMENT CO., LTD., Jiangxi (CN)

(72) Inventors: Aimin Deng, Jiangxi (CN); Fangcheng Zeng, Jiangxi (CN); Xiaoguang Shao, Jiangxi (CN); Zhen Wei, Jiangxi (CN); Gang Li, Jiangxi (CN); Jingzhang Lin, Jiangxi (CN); Minyong Hu, Jiangxi (CN); Mulian Tu, Jiangxi (CN); Daoshun Cheng, Jiangxi (CN); Lei Li, Jiangxi (CN); Jialiang Wang, Jiangxi (CN); Hongdao Peng, Jiangxi (CN); Jianfei Huang, Jiangxi (CN)

(73) Assignee: JIANGXI NERIN EQUIPMENT CO., LTD., Jiangxi (CN)

( * ) Notice: Subject to any disclaimer, the term of this patent is extended or adjusted under 35 U.S.C. 154(b) by 0 days.

(21) Appl. No.: 17/881,216

(22) Filed: Aug. 4, 2022

(65) Prior Publication Data

US 2022/0371082 A1  Nov. 24, 2022

Related U.S. Application Data

(63) Continuation of application No. PCT/CN2020/122508, filed on Oct. 21, 2020.

(30) Foreign Application Priority Data

Mar. 11, 2020 (CN) .......................... 202010167918.0
Mar. 11, 2020 (CN) .......................... 202020297747.9

(51) Int. Cl.
*B22D 25/04* (2006.01)
*B22D 29/08* (2006.01)
(Continued)

(52) U.S. Cl.
CPC ........ *B22D 11/1241* (2013.01); *B22D 11/128* (2013.01); *B22D 25/04* (2013.01); *B22D 29/08* (2013.01)

(58) Field of Classification Search
CPC ........ B22D 25/04; B22D 29/00; B22D 29/04; B22D 29/08; B22D 30/00
(Continued)

(56) References Cited

U.S. PATENT DOCUMENTS

2004/0050660 A1  3/2004  Lumppio
2009/0099688 A1  4/2009  Salamanca

FOREIGN PATENT DOCUMENTS

CN       1484604 A      3/2004
CN     103537655 A      1/2014
(Continued)

OTHER PUBLICATIONS

Sumit Kumar, "Office Action for India application 202237044426", dated Jan. 31, 2023, Intellectual Property India, India.
(Continued)

*Primary Examiner* — Kevin P Kerns
(74) *Attorney, Agent, or Firm* — Bridgeway IP Law Group, PLLC; Jihun Kim

(57) ABSTRACT

A casting and outputting system is provided. The system includes a casting machine, a disc body, a transfer device, a special fixture, a cooling tank, a collection device and a waste plate rack. The transfer device is configured to drive the special fixture to take out anode plates cast on the disc body, place a qualified one of the anode plates in the cooling tank, place an unqualified one of the anode plates on the waste plate rack, lift the anode plate cooled in the cooling tank, and place the cooled anode plate on the collection device for stacking.

11 Claims, 3 Drawing Sheets

(51) Int. Cl.
*B22D 30/00* (2006.01)
*B22D 11/124* (2006.01)
*B22D 11/128* (2006.01)

(58) Field of Classification Search
USPC ....... 164/348, 131, 344, 404, 129, 130, 322, 164/323, 324, 325, 326
See application file for complete search history.

(56) References Cited

FOREIGN PATENT DOCUMENTS

| | | |
|---|---|---|
| CN | 203509006 U | 4/2014 |
| CN | 204430245 U | 7/2015 |
| CN | 204603277 U | 9/2015 |
| CN | 105436477 A | 3/2016 |
| CN | 207537559 U | 6/2018 |
| CN | 207695609 U | 8/2018 |
| CN | 110615240 A | 12/2019 |
| JP | H06344119 A | 12/1994 |
| JP | 2010058127 A | 3/2010 |
| JP | 2010082664 A | 4/2010 |
| JP | 2011506102 A | 3/2011 |
| JP | 2015160216 A | 9/2015 |
| SU | 270202 A1 | 3/1978 |
| WO | 2019042382 A1 | 3/2019 |

OTHER PUBLICATIONS

Toru Matsuoka et al., "Office Action for JP application 2022-541980", dated Mar. 12, 2023, JPO, Japan.

CASTING AND OUTPUTTING SYSTEM

CROSS-REFERENCE TO RELATED APPLICATION

This application is based on International Application No. PCT/CN2020/122508, filed Oct. 21, 2020, which is incorporated by reference in its entirety and claims priority to and benefits of Chinese Patent Application Nos. 202010167918.0 and 202020297747.9, both filed with the National Intellectual Property Administration of P. R. China on Mar. 11, 2020, the entire contents of which are incorporated herein by reference.

FIELD

The present disclosure relates to a technical field of nonferrous metallurgical equipment, and more particularly to a casting and outputting system.

BACKGROUND

In a nonferrous industry, there are two main ways of outputting anode plates from a disc casting machine.

U.S. Pat. No. 3,938,672 discloses a device for outputting anode plates from a disc casting machine. A gripper supports lugs on both sides of an anode plate in a manner of "lug gripping", and the anode plate is moved or rotated to a tank by a rack. Since the lugs of the anode plate are thin and soft, and not completely cooled, the lugs are easily deformed and thus easily fall from a high place, resulting in safety accidents, high failure rate and poor reliability.

Chinese Patent No. CN1224562C discloses a device for conveying a plate-like product. A flexible gripping element grips a middle part of an anode plate on a wheel body in a manner of "waist holding" to place the anode plate at a tail end of a chain in a cooling tank by a rotating gripper arm. During a forward conveying process of a chain head, the anode plates are cooled and collected, and then lifted up by a lifting device in the cooling tank for stacking, and a stack of the anode plates is finally taken away by a forklift. Compared with the manner of "lug gripping", extracting and transferring of the anode plate in the manner of "waist holding" is more stable and reliable, and a "waist holding" device is widely used. However, the cooling tank for outputting from a casting wheel contains moving devices such as chain conveyors and lifting mechanisms, which occupies a large space, has a complex structure and high maintenance cost. Moreover, the anode plate cannot be cooled evenly, and has large deformation and poor quality.

In addition, the extractor equipped with the above-mentioned grippers extracts the anode plate in a relatively fixed position and posture, such that the corresponding positions of the cooling tank and the waste plate rack are substantially fixed. In some improved solutions with limited space, the newly added cooling tank, waste plate rack or forklift channel of the disc casting machine is often too close to or even interferes with existing equipment such as plant pillars, which is not conducive for plate forking of the forklift.

SUMMARY

The present disclosure seeks to solve at least one of the technical problems existing in the related art. To this end, the present disclosure provides a casting and outputting system.

According some embodiments of the present disclosure, the casting and outputting system includes a casting machine, a rotatable disc body, a transfer device, a special fixture, a cooling tank, a collection device and a waste plate rack. The rotatable disc body is located on the casting machine, and has a casting positions and a plate taking position. The transfer device is located in front of the plate taking position of the disc body. The special fixture is connected to an execution end of the transfer device. The cooling tank is located near the transfer device. The collection device is located near the cooling tank and the transfer device. The waste plate rack is located near the transfer device. The transfer device is configured to drive the special fixture to take out anode plates cast on the disc body, place a qualified one of the anode plates in the cooling tank, place an unqualified one of the anode plates on the waste plate rack, lift the anode plate cooled in the cooling tank, and place the cooled anode plate on the collection device for stacking.

In an embodiment of the present disclosure, the special fixture is configured to grip the anode plate through clamping a middle part of a body of the anode plate by clamping arms provided on both sides of the anode plate.

In an embodiment of the present disclosure, the special fixture is configured to grip the anode plate by lifting lugs on both sides of the anode plate through hooks provided on both sides of the anode plate.

In an embodiment of the present disclosure, the transfer device is connected to the special fixture via a flexible element.

In an embodiment of the present disclosure, the special fixture is rotatable with respect to the transfer device.

In an embodiment of the present disclosure, a rotation angle between a first connection flange of the transfer device and a second connection flange of the special fixture ranges from 0° to 5°.

In an embodiment of the present disclosure, a plurality of cooling tanks are provided, and are spaced apart from each other.

In an embodiment of the present disclosure, the plurality of cooling tanks are arranged in multiple rows on opposite sides of the transfer device, a plurality of collection devices are provided, and each row of the cooling tanks corresponds to at least one of the collection devices.

In an embodiment of the present disclosure, a plurality of disc bodies are provided, each of the disc bodies is provided with one cooling tank, and the cooling tank is provided with at least three anode plates spaced apart from each other.

In an embodiment of the present disclosure, each of the at least three anode plates is vertically arranged in the cooling tank.

In an embodiment of the present disclosure, a plurality of disc bodies are provided, each of the disc bodies is provided with a plurality of cooling tanks, and each of the cooling tanks is provided with one anode plate.

In an embodiment of the present disclosure, the anode plate is horizontally or obliquely arranged in the cooling tank.

In an embodiment of the present disclosure, a plurality of disc bodies are provided in one-to-one correspondence with a plurality of transfer devices.

Additional aspects and advantages of embodiments of present disclosure will be given in part in the following descriptions, become apparent in part from the following descriptions, or be learned from the practice of the embodiments of the present disclosure.

REFERENCE NUMERALS

Figure 1:
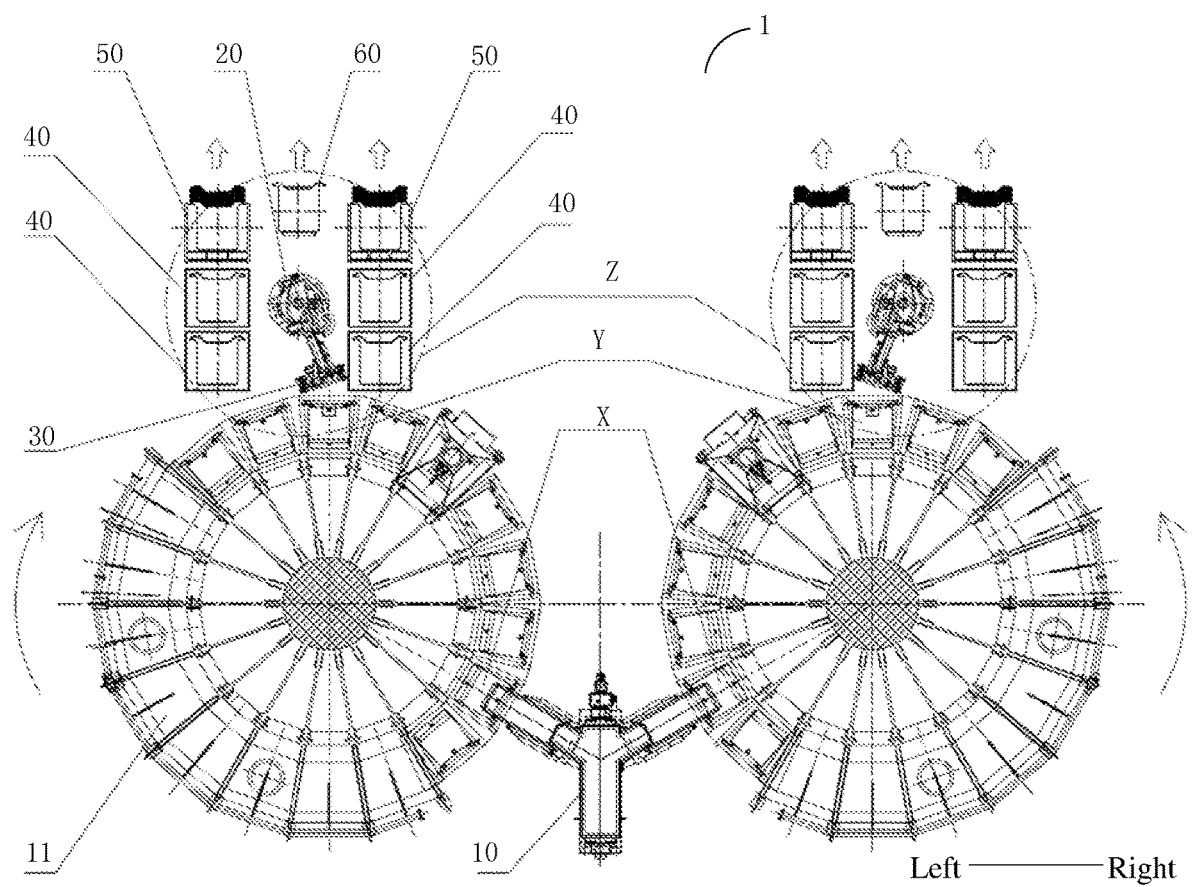
FIG. 1 is a schematic view showing a casting and outputting system according to an embodiment of the present disclosure.

1: casting and outputting system; 10: casting machine; 11: disc body; 20: transfer device; 30: special fixture; 40: cooling tank; 50: collection device; 60: waste plate rack; 70: flexible element.

DETAILED DESCRIPTION

Embodiments of the present disclosure are described in detail below, examples of which are illustrated in the drawings. The same or similar elements are denoted by same reference numerals in different drawings unless indicated otherwise. The embodiments described herein with reference to drawings are explanatory, and only used to understand the present disclosure. The embodiments shall not be construed to limit the present disclosure.

A casting and outputting system 1 according to some embodiments of the present disclosure will be described below with reference to the accompanying drawings. The casting and outputting system 1 has small footprint, flexible layout, low failure rate, high intelligence and high stability, and the anode plate has good cooling effect, small deformation and less oxidation.

Figure 2:
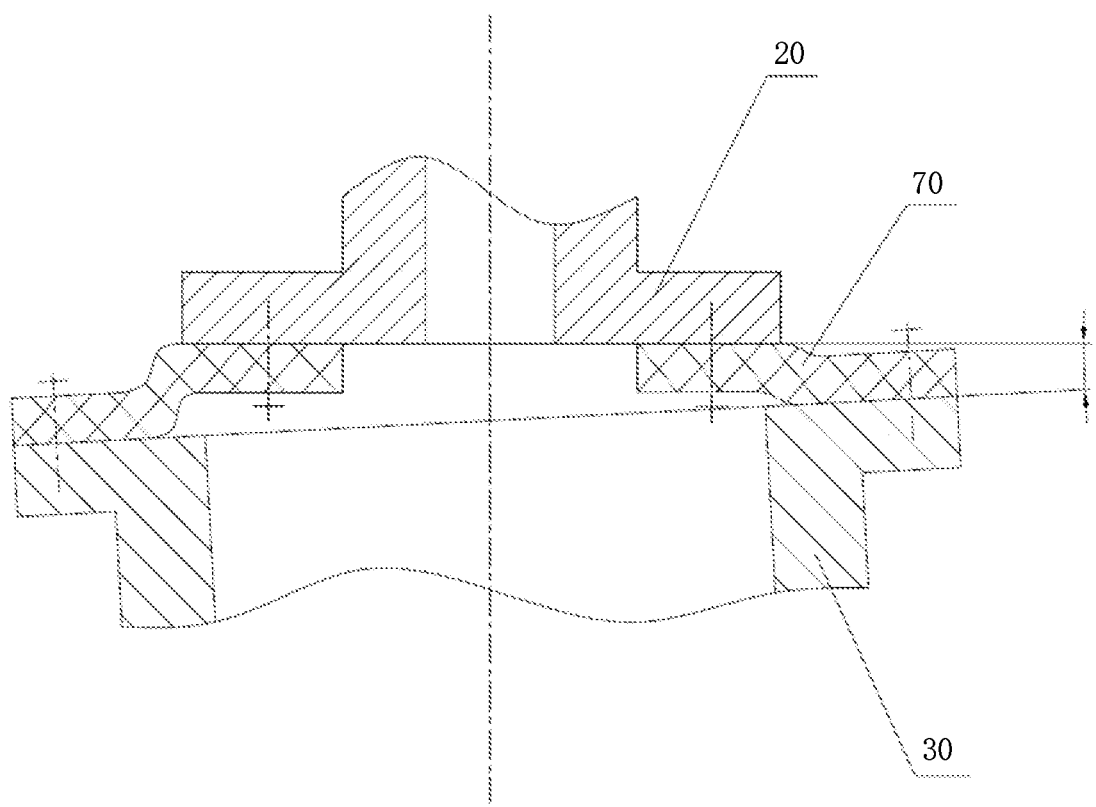
FIG. 2 is a schematic view showing a connection between an execution end of a transfer device and a special fixture of a casting and outputting system according to an embodiment of the present disclosure.
Figure 3:
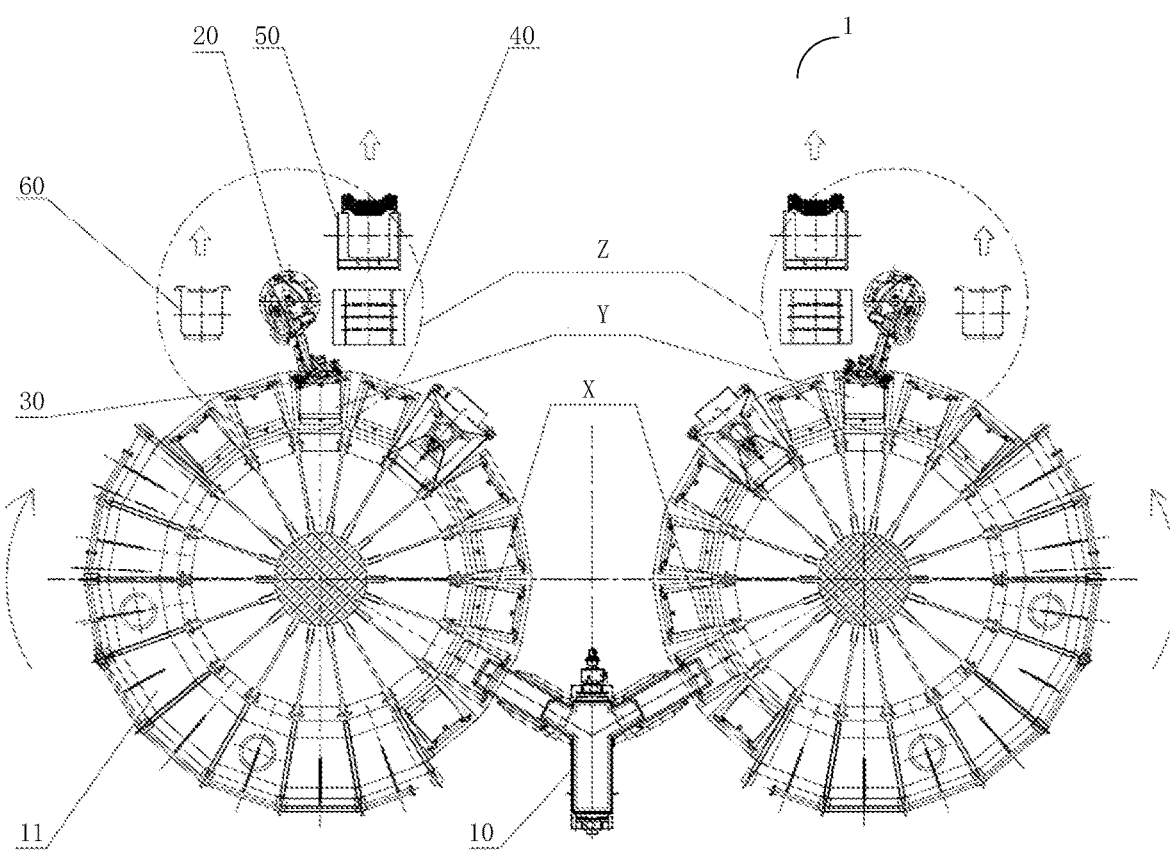
FIG. 3 is a schematic view showing a casting and outputting system according to an optional embodiment of the present disclosure.

As shown in FIG. 1 to FIG. 3, the casting and outputting system 1 according to some embodiments of the present disclosure includes a casting machine 10, a transfer device 20, a special fixture 30, a cooling tank 40, a collection device 50 and a waste plate rack 60.

Specifically, the casting machine 10 has a rotatable disc body 11, and the disc body 11 has a casting position X and a plate taking position Y. The transfer device 20 is arranged in front of the plate taking position Y of the disc body 11. The special fixture 30 is connected to an execution end of the transfer device 20. The cooling tank 40 and the waste plate rack 60 are arranged near the transfer device 20, respectively. The collection device 50 is arranged near the cooling tank 40 and the transfer device 20. The transfer device 20 is configured to drive the special fixture 30 to take out anode plates cast on the disc body 11, place a qualified one of the anode plates in the cooling tank 40, place an unqualified one of the anode plates on the waste plate rack 60, lift the anode plate cooled in the cooling tank 40, and place the cooled anode plate on the collection device 50 for stacking.

In this way, by using the transfer device 20, a chain conveyor, a lifting mechanism and other moving devices arranged in the tank in the related art may be eliminated, such that the structure is simplified, the anode plate has good cooling effect, small deformation, less oxidation, and improved quality. Moreover, since the transfer device 20 is a mature standardized product, which has high degree of intelligence, low failure rate, and less equipment maintenance.

In addition, the number and position of the cooling tanks 40, the collection devices 50 and the waste plate racks 60 may be adjusted modularly according to different sites and functional requirements, leading to more flexible arrangement and smaller space occupation compared with a traditional extractor. For example, the cooling tank 40, the collection device 50 and the waste plate rack 60 may be located in a movement zone Z around the execution end of the transfer device 20, and be conveniently adjusted in terms of quantity, placement position and placement angle as required to adapt to different site requirements and make a forklift travel more smoothly.

According to the casting and outputting system 1 in some embodiments of the present application, the anode plate may be transferred reliably, and the equipment may have reduced space occupation, low failure rate and less maintenance cost.

In some embodiments of the present disclosure, as shown in FIG. 2, the special fixture 30 is flexibly connected to the transfer device 20. For example, a flexible element 70 is arranged between the transfer device 20 and the special fixture 30, such that the special fixture 30 is rotatable with respect to the transfer device 20, thereby flexibly adapting to change in a position of the anode plate to be gripped within an error range. At the same time, the special fixture 30 performs a function of automatically centering the gripped anode plates, which improves the plate gripping reliability and the plate placing accuracy.

In some embodiments of the present disclosure, as shown in FIG. 2, a rotation angle between a connection flange of the transfer device 20 and a connection flange of the special fixture 30 ranges from 0° to 5°.

In some embodiments of the present disclosure, as shown in FIG. 1, a plurality of cooling tanks 40 are provided, and are spaced apart from each other. In this way, a plurality of the anode plates may be cooled simultaneously.

In some embodiments of the present disclosure, as shown in FIG. 1, the plurality of cooling tanks 40 are arranged in multiple rows on opposite sides of the transfer device 20, a plurality of collection devices 50 are provided, and each row of the cooling tanks 40 corresponds to at least one of the collection devices 50. For example, each row of the cooling tanks 40 is arranged on one of opposite sides of the transfer device 20, and each row of the cooling tanks 40 corresponds to one of the collection devices 50. The waste plate rack 60 is arranged between two collection devices 50, resulting in a relatively compact structure and easy operation of the transfer device 20.

In some embodiments of the present disclosure, as shown in FIG. 3, a plurality of disc bodies 11 are provided, each of the disc bodies 11 is provided with one cooling tank 40, and the cooling tank 40 is provided with at least three anode plates spaced apart from each other. In this way, by placing a plurality of anode plates in the cooling tank 40 at intervals, the cooling effect may be ensured. Further, each anode plate is vertically arranged in the cooling tank 40.

In some embodiments of the present disclosure, as shown in FIG. 1, a plurality of disc bodies 11 are provided, each of the disc bodies 11 is provided with a plurality of cooling tanks 40, and each of the cooling tanks 40 is provided with one anode plate. In this way, a plurality of anode plates may be cooled at the same time, and the cooling effect of each anode plate is good. Further, the anode plate is horizontally or obliquely arranged in the cooling tank 40 to enhance the cooling effect.

In some embodiments of the present disclosure, as shown in FIG. 1 and FIG. 3, a plurality of disc bodies 11 are provided in one-to-one correspondence with a plurality of transfer devices 20.

Some specific embodiments according to the present disclosure will be described in detail below with reference to the accompanying drawings.

Embodiment 1

As shown in FIG. 1, in this embodiment, a transfer device 20 is arranged in front of a plate taking position Y of a disc body 11. The transfer device 20 is a mechanical arm with a plurality of independent single-degree-of-freedom joints, which is a mature standardized product, and has high degree of intelligence, low failure rate, and less equipment maintenance. A special fixture 30 grips an anode plate in a manner of "waist holding", that is, a middle part of a body of the anode plate is clamped by clamping arms provided on both sides of the anode plate, so as to ensure the stable gripping of the anode plate.

Each disc body 11 is provided with four cooling tanks 40, and the four cooling tanks 40 are respectively arranged on two sides of the transfer device 20. Further, the four cooling tanks 40 are independent from each other, and each cooling tank 40 may be provided with at most one anode plate in any period of time, that is, each cooling tank 40 contains one anode plate cooling station. The four cooling tanks 40 may be configured to cool the anode plates alternately. After continuous and stable production of the casting machine 10 is achieved, the cooling time of the individual anode plates may be substantially the same, resulting in more stable cooling effect of the anode plate compared with a chain conveyor in a traditional tank where the cooling time of individual anode plates decreases one by one.

In this way, in this embodiment, the four cooling tanks 40 are not provided with any moving parts, and the structure is simple, the cost of spare parts is low. It could be understood that the greater the number of the cooling tanks 40, and the longer the cooling time of each anode plate, the better the cooling effect.

In this embodiment, two collection devices 50 are respectively arranged outside the above four cooling tanks 40 and are independent from each other, and are configured to receive the cooled anode plates transferred by the transfer device 20 and the special fixture 30 from the individual cooling tanks 40 one by one. After the anode plates are collected and stacked, a whole stack of anode plates are taken away by a forklift. It could be understood that the greater the number of the collection devices 50, the stronger the storage capacity, the less the dependence on the timeliness of forklift operation, and the more stable the system. At the same time, individual cooling tanks 40 and individual collection devices 50 are independent from each other, such that even if a certain device fails, other devices may also continue to run, and the equipment has high stability.

Each disc body 11 is provided with one waste plate rack 60, and the waste plate rack 60 is arranged between the above-mentioned two collection devices 50 for receiving unqualified anode plates transferred by the transfer device 20 and the special fixture 30 from the disc body 11. In this way, the four cooling tanks 40, the two collection devices 50 and the waste plate rack 60 are all arranged within a movement zone Z of the transfer device 20.

A working process of the casting and outputting system 1 according to this embodiment will be described below with reference to FIG. 1. Assuming that each cooling station has no anode plates at the beginning, an anode plate A, an anode plate B, an anode plate C, . . . are respectively outputted in sequence from the plate taking position Y of the disc body 11.

S1: The transfer device 20 and the special fixture 30 grip the anode plate A from the plate position Y of the disc body 11, and transfer it to a cooling tank 40 on the lower left side for cooling.

S2: The transfer device 20 and the special fixture 30 grip a next anode plate B from the plate position Y of the disc body 11, and transfer it to a cooling tank 40 on the lower right side for cooling.

S3: The transfer device 20 and the special fixture 30 grip a next anode plate C from the plate position Y of the disc body 11, and transfer it to a cooling tank 40 on the upper left side for cooling.

S4: The transfer device 20 and the special fixture 30 grip the cooled anode plate A in the cooling tank 40 on the lower left side, and transfer it to a collection device 50 on the left side for stacking.

S5: The transfer device 20 and the special fixture 30 grip a next anode plate D from the plate position Y of the disc body 11, and transfer it to a cooling tank 40 on the upper right side for cooling.

S6: The transfer device 20 and the special fixture 30 grip the cooled anode plate B in the cooling tank 40 on the lower right side, and transfer it to a collection device 50 on the right side for stacking.

S7: As above, the transfer device 20 and the special fixture 30 alternately place the anode plates from the disc body 11 in individual cooling tanks for cooling, and transfer the cooled anode plates to the collection device 50 at a corresponding side.

S8: If the anode plate from the plate taking position Y of the disc body 11 is unqualified, the transfer device 20 and the special fixture 30 directly grip the unqualified anode plate to place it on a waste plate rack 60.

S9: When the number of the anode plates stacked by the two collection devices 50 reaches a preset value, the whole stack of the anode plates is taken away by a forklift.

S10: When the number of waste anode plates in the waste plate rack 60 reaches a preset value, the whole stack of waste anode plates is taken away by a forklift.

Embodiment 2

As shown in FIG. 3, in this embodiment, a transfer device 20 is arranged in front of a plate taking position Y of a disc body 11. The transfer device 20 is a mechanical arm with a plurality of independent single-degree-of-freedom joints, which is a mature standardized product, and has high degree of intelligence, low failure rate, and less equipment maintenance. A special fixture 30 grips an anode plate in a manner of "lug gripping", that is, the anode plate is gripped by lifting lugs on both sides of the anode plate through hooks provided on both sides of the anode plate.

Each disc body 11 is provided with one cooling tank 40, and the cooling tank 40 is provided with at least three anode plate cooling stations. The anode plates are alternately placed in the three anode plate cooling stations by the transfer device 20 for cooling. After continuous and stable production of the casting machine 10 is achieved, the cooling time of the individual anode plates may be substantially the same, resulting in more stable cooling effect of the anode plate compared with a chain conveyor in a traditional tank where the cooling time of individual anode plates decreases one by one. At the same time, the cooling tank 40 is provided with a simple carrier, which may support the lugs on both sides of the anode plate. That is, there are no moving parts in the cooling tank 40, which has a simple structure and low cost of spare parts.

It could be understood that the greater the number of the cooling stations in the cooling tank 40, and the longer the cooling time of each anode plate, the better the cooling effect.

In this embodiment, a collection device 50 is arranged outside each cooling tank 40 to receive the cooled anode plates transferred from the cooling tank 40 by the transfer device 20 and the special fixture 30 one by one. In this way, a whole stack of anode plates may be taken away by a forklift after the anode plates are stacked.

Each disc body 11 is provided with one waste plate rack 60, and the waste plate rack 60 is arranged outside the transfer device 20. For example, the waste plate rack 60 and the cooling tank 40 are respectively located on the left and right sides of the transfer device 20 for receiving unqualified anode plates transferred from the disc body 11 by the transfer device 20 and the special fixture 30.

Other structures and operations of the casting and outputting system 1 according to some embodiments of the present disclosure are known to those skilled in the art, and will not be described in detail here.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise" "axial," "radial," and "circumferential" should be construed to refer to the orientation as shown in the drawings under discussion. These relative terms are for convenience of description and do not require that the present disclosure be constructed or operated in a particular orientation, and thus cannot be construed to limit the present disclosure.

In addition, terms such as "first" and "second" are used herein for the purpose of description and are not intended to indicate or imply relative importance or to imply the number of indicated technical features. Thus, the feature defined with "first" and "second" may comprise one or more of this feature. In the description of the present disclosure, "a plurality of" means two or more than two, unless specified otherwise.

In the description of the present disclosure, "first feature" or "second feature" may include one or more of the feature. A structure in which the first feature is "above" or "under" the second feature may include an embodiment where the first feature and the second feature are in direct contact, and may also include an embodiment where the first feature and the second feature are not in direct contact but are in contact through another feature between them. A structure in which the first feature is "above", "over" or "on" the second feature includes an embodiment where the first feature is directly above and obliquely above the second feature, or simply means that the first feature is at a height larger than the second feature.

In the present disclosure, unless specified or limited otherwise, the terms "mounted," "connected," "coupled," and the like are used broadly, and may be, for example, fixed connections, detachable connections, or integral connections; may also be mechanical or electrical connections; may also be direct connections or indirect connections via intervening structures; and may also be inner communications of two elements, which can be understood by those skilled in the art according to specific situations.

Reference throughout this specification to "an embodiment," "some embodiments," "a specific example," "an example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that changes, alternatives, variations and modifications can be made in the embodiments without departing from principles and scope of the present disclosure. The scope of the present disclosure is defined by claims and equivalents thereof.

What is claimed is:

1. A casting and outputting system, comprising:
   a casting machine;
   a rotatable disc body, located on the casting machine, and having a casting position and a plate taking position;
   a transfer device, located in front of the plate taking position of the disc body;
   a special fixture, connected to an execution end of the transfer device;
   a cooling tank, located near the transfer device;
   a collection device, located near the cooling tank and the transfer device; and
   a waste plate rack, located near the transfer device,
   wherein the transfer device is configured to drive the special fixture to take out anode plates cast on the disc body, place a qualified one of the anode plates in the cooling tank, place an unqualified one of the anode plates on the waste plate rack, lift an anode plate cooled in the cooling tank, and place the cooled anode plate on the collection device for stacking;
   wherein a plurality of disc bodies are provided, each of the disc bodies is provided with one cooling tank, and the cooling tank is provided with at least three anode plates spaced apart from each other; or wherein a plurality of disc bodies are provided, each of the disc bodies is provided with a plurality of cooling tanks, and each of the cooling tanks is provided with one anode plate.

2. The casting and outputting system according to claim 1, wherein the special fixture is configured to grip the anode plate through clamping a middle part of a body of the anode plate by clamping arms provided on both sides of the anode plate.

3. The casting and outputting system according to claim 1, wherein the special fixture is configured to grip the anode plate by lifting lugs on both sides of the anode plate through hooks provided on both sides of the anode plate.

4. The casting and outputting system according to claim 1, wherein the transfer device is connected to the special fixture via a flexible element.

5. The casting and outputting system according to claim 1, wherein the special fixture is rotatable with respect to the transfer device.

6. The casting and outputting system according to claim 5, wherein a rotation angle between a first connection flange of the transfer device and a second connection flange of the special fixture ranges from 0° to 5°.

7. The casting and outputting system according to claim 1, wherein the plurality of cooling tanks are provided, to be spaced apart from each other.

8. The casting and outputting system according to claim 7, wherein the plurality of cooling tanks are arranged in multiple rows on opposite sides of the transfer device, a plurality of collection devices are provided, and each row of the cooling tanks corresponds to at least one of the collection devices.

9. The casting and outputting system according to claim 1, wherein in case that the plurality of the disc bodies are provided, each of the disc bodies is provided with one cooling tank, and the cooling tank is provided with at least three anode plates spaced apart from each other, each of the at least three anode plates is vertically arranged in the cooling tank.

10. The casting and outputting system according to claim 1, wherein in case that the plurality of the disc bodies are provided, each of the disc bodies is provided with the plurality of cooling tanks, and each of the cooling tanks is provided with one anode plate, the anode plate is horizontally or obliquely arranged in each of the cooling tanks.

11. The casting and outputting system according to claim 1, wherein the plurality of disc bodies are provided in one-to-one correspondence with a plurality of transfer devices.

* * * * *